United States Patent

[11] 3,549,855

[72] Inventor Gerald A. Lawrence
 Detroit, Mich.
[21] Appl. No. 714,850
[22] Filed Mar. 21, 1968
[45] Patented Dec. 22, 1970
[73] Assignee La-Mark Corporation
 Detroit, Mich.
 a corporation of Michigan

[54] JIG WELDING GUN
 7 Claims, 4 Drawing Figs.
[52] U.S. Cl. .................................................. 219/130
[51] Int. Cl. .................................................. B23k 9/28
[50] Field of Search ........................................ 219/74-
 —77, 130, 136

[56] References Cited
 UNITED STATES PATENTS
 2,360,160 10/1944 Pickhaver ..................... 219/74X
 3,033,973 5/1962 McNutt ......................... 219/130

Primary Examiner—Joseph V. Truhe
Assistant Examiner—J. G. Smith
Attorney—Irving M. Weiner ABSTRACT: A jig welding gun being constructed in such a manner that optimum position of the tungsten rod with respect to a work piece can be easily accomplished through the combination of a rough and a fine adjusting means. These adjusting means are respectively a pair of knurled nuts located for rotation about and along the gun body, for positioning and fastening the gun at an approximate lateral required position in a jig or the like, and fine adjusting means for locating optimum position of the gun's output which is provided by a means including wedge-shaped components slidably positioned with one another for producing axial movement of the rod through the inducement of a force at an approximate 90° angle which force in turn is caused by rotation of a screw adjusting and locking means.

PATENTED DEC 22 1970
3,549,855
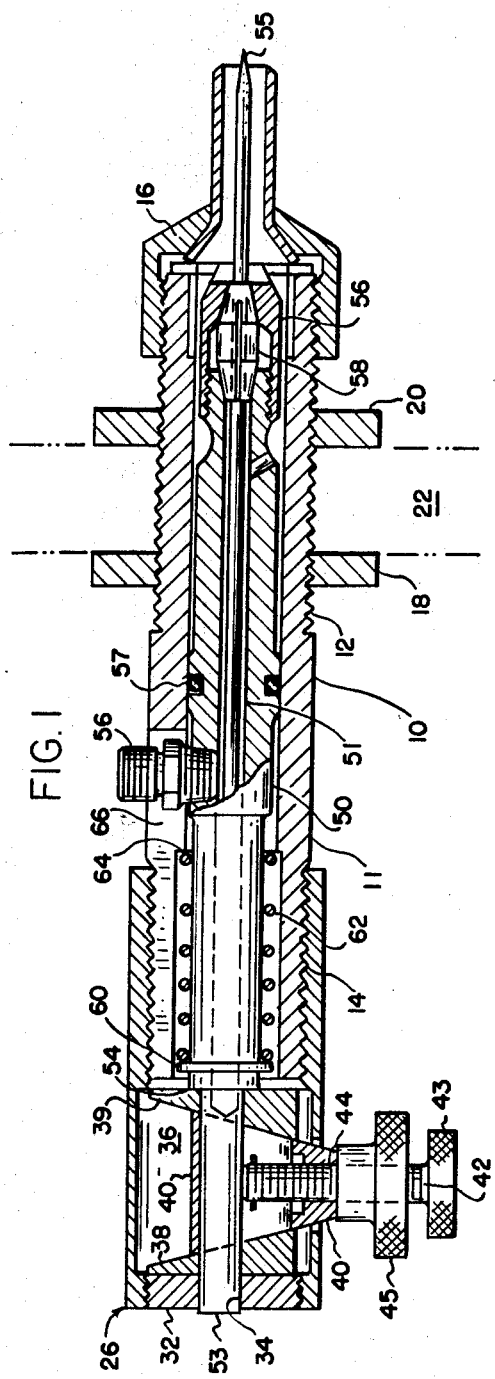
FIG. 1
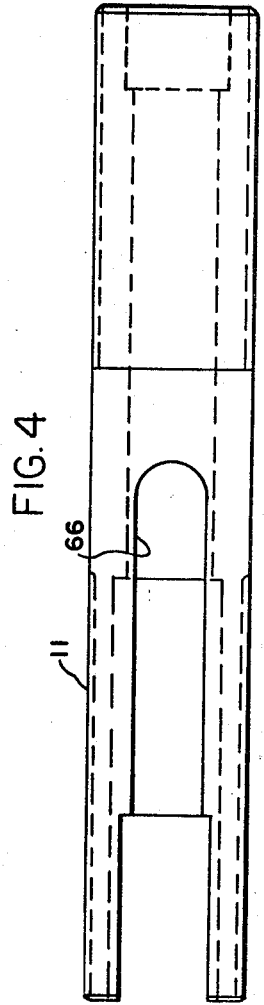
FIG. 4
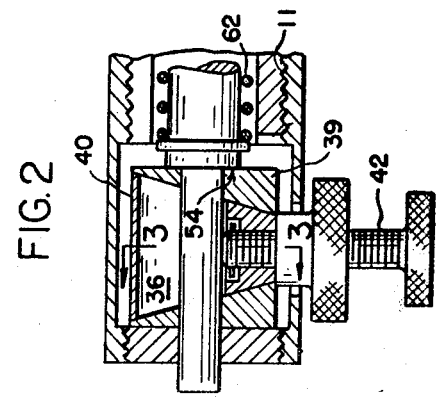
FIG. 3
FIG. 2
INVENTOR
GERALD A. LAWRENCE
BY Nicholas M. Vogel
AGENT

JIG WELDING GUN

BACKGROUND OF THE INVENTION

The present invention relates to welding guns which are used primarily in large jigs or fixtures for T.I.G. (tungsten inert gun) welding of a work piece moving on an assembly line. One of the prime purposes in the art of welding is to unite metallic parts by heating so that the metals are allowed to flow and join together to form an integral mass. A consistent weld can thus be accomplished through a complete fusion of the joints; however, in the industry and especially where mass production of components on assembly line basis is concerned, a complete fusion of the welds, or in other words a reliable weld, has not always been produced. In most cases the failure of a reliable weld was found to be the inexact position of the welding gun in relationship to the product to be welded. It is a well-known fact that the exact position of the welding gun and its inherent degrees of output temperature are most essential in producing a reliable weld. However, heretofore the mounting, positioning an and adjusting of welding guns positioned in jigs or fixtures has been a cumbersome and time-consuming operation.

Another problem in the prior art is the regular replacement of the tungsten rod which, especially in welding guns mounted in jigs, demand complete reassembling and remounting procedures.

THE SUMMARY OF THE PRESENT INVENTION

This invention overcomes the above mentioned a disadvantages in the art and solves the needs by providing a welding gun capable of being positioned in a jig or welding fixture within the prescribed tolerances and having adjusting means which moves the rod to the exact distance from the work piece to that a perfect and reliable weld can be made. A continuous operation can be thus relied upon and minor adjustments easily performed.

The replacement of the tungsten rod can be easily accomplished in this invention through its unique construction, by unscrewing one part (the housing) without disturbing the mounted position of the welding gun body in its mounting fixture. When the rod is placed in position, only fine adjustments have to be made in order to produce the correct flame output. Thus the replacement of the old rod for a new one can be accomplished in a matter of seconds.

Accordingly, it is an object of the present invention to provide a welding gun having fastening means for mounting the gun in the required position on a welding fixture or jig.

Another object of this invention is to provide a welding gun where the lateral position can be roughly adjusted and thereafter readjusted by fine increments so that an optimum position of the welding gun can be achieved.

A still further object of the invention is to provide a welding gun wherein the replacement of the welding rod can be easily accomplished without removing the gun from its jig fixture, through the one step of unscrewing the housing of the welding gun from the body.

Still another object of the present invention is to provide a welding gun which is easily and economically manufactured, has a minimum of components and is light, portable, dependable and easily operated without practically any maintenance.

Furthermore, this invention provides other objects, features and advantages which will become fully apparent from the following detailed description taken in conjunction with the accompanying drawings which illustrate and clarify the preferred embodiment of this device.

DESCRIPTION OF THE DRAWINGS

FIG. 1 illustrates a sectional side view taken along the longitudinal axis of the preferred embodiment of the welding gun.

FIG. 2 illustrates a sectional view of the fine adjustment mechanism as is shown in FIG. 1 with the exception that the adjusting mechanism has been moved in the opposite adjusting direction.

FIG. 3 is a cross section of the wedge means only, taken from FIG. 2 along line 3–3.

FIG. 4 illustrates a plan view of the body section of the welding gun.

DESCRIPTION OF A PREFERRED EMBODIMENT

Referring now to the drawings wherein like characters designate corresponding parts throughout the figures, there is shown in FIG. 1 a welding gun 10 having a central body portion 11 provided with external screwthreads 12 at its front portion and external screwthreads 14 at its rear portion portion.

A nozzle 16 having internal threads is engaged to the front portion of the body 11. A pair of mounting nuts 18 and 20 are engaged with the external screwthreads 12 for fastening the welding gun 10 at the required location along the body 11 to an associated jig or fixture 22. By loosening the nuts 18 and 20 the welding gun can be repositioned at various locations.

A housing 26, provided with internal thread means which compliment the external thread means 14, is engaged to the rear portion of the body 11. The end portion of the housing 26 is closed by a nut 32 having a rod guiding opening 34 at its center. A fine adjusting mechanism 36, comprising a pair of washers 38 and 39 having a cross-sectional right-angled triangle configuration in combination with slidably positioned wedge means 40 of frustoconical cross-sectional configuration is positioned within the housing 26. A fine adjusting screw 42, with a knurled nut portion 43 and external fine threading means 44, is engaged with the wedge means 40 in such a manner that rotational motion of the screw 42 will transfer linearmotion to the wedge means 40, which in turn is slidably engaged between the washers 38 and 39. A lock nut 45 is engaged with a fine adjusting screw 42 for manually locking the required adjusted position obtained by said screw 42. Within the assembled body 11 and housing 26 is a slidably positioned rod holding means or shaft 50 having a bore 51.

The rear portion of the shaft 50 is provided with a flange means 60, a shoulder 54 and an integral extension 53, having a reduced diameter 53.

At its front portion, the rod holding means 50 is provided with means to engage a nut 56, which last component in conjunction with a self-resilient collet means 58, positions a tungsten rod 55, within the exact center of the bore 51. At its intermediate portion, the rod holding means 50 is provided with a fitting 59 for connection with a gas and an electric power supply source, not shown. A grommet seal 57 is installed in order to prevent gasses from travelling toward the housing 26.

A resilient means, such as a spring 62, is compressed between flange 60 and an internal shoulder 64, within the body 11, so that a continuous force tends to move the rod holding means 50 with its shoulder 54 against the washer 39.

The washers 38 and 39 and the wedge means 40 are held through the same force in a surface contact compressed arrangement. By adjusting the screw 42 the wedge means 40 will move in between the washers 38 and 39, thereby changing the distance between the washers 38 and 39. Since washer 38 is stationary positioned, only washer 39 will move and thus inherently move the shaft 50 along its longitudinal axis. As shown in FIG. 1 the position the shaft 50, and thereby the welding rod 55, is at its most forward location and a new tungsten rod should be inserted.

Replacing of the tungsten rod 55 is accomplished very easily and without disconnecting the welding gun 10 from the mounted location in its associated fixture 22. Also the disconnection of the gas and electrical power supply from fitting 59 is not necessary. By unscrewing the housing 26 from the rear of body portion 11 the housing 26 with its fine adjusting mechanism 36 can be removed.

Since the rear portion of the body, as shown in FIG. 4, is provided with an elongated slot 66, the shaft 50 with its fitting 59 can be slidably removed by pulling the shaft from the body 11. After unscrewing the nut 56, the used tungsten rod 55 can be removed and a new tungsten rod can be inserted, positioned and fastened by the collet 58 and nut 56. The shaft 50 can now be inserted and the housing 26 can be replaced. By manually turning the adjusting nut 42, the fine adjusting mechanism 36 will then move the tungsten rod 55, as described hereinbefore, in the correct required position. The arrangement of the various components of the fine adjusting mechanism 36 will then be in conformity with the illustration as shown in FIG. 2. should be realized that this type of welding gun 10 is used in fixtures where, for instance, jig or spot welding has to be performed to a work piece, the last normally moving on an assembly line, at fifty or more locations simultaneously. Thus, for example, fifty or more welding guns are mounted in one fixture at various predetermined locations and therefore, it can be seen, that rod replacement and adjustment are two factors which should be accomplished in the most convenient and expeditious manner. Accordingly, the present invention as described and illustrated, provides a significant improvement in the art of manufacturing and constructing welding guns and also provides features, such as mounting and fine adjusting as well as an unique disassembling method for tungsten rod replacement in particular, all of which have been very badly needed in this field.

Having thus described this invention, it will be obvious that various other structural modifications may be contemplated by those skilled in the art without departing from the spirit and scope of the present invention as hereinafter defined by the appended claims.

I claim:

1. A welding gun apparatus having a fine rod adjusting means, the improvement comprising:
   a. a housing means operably engaged to said welding apparatus body;
   b. a rod holding means partly disposed within said housing and positioned therein by guiding and resilient means;
   c. a plurality of wedge-shaped members disposed about said rod holding means within said housing;
   d. shoulder means disposed on said rod holding means for keeping said members in abutting contact with one another, between and against said guiding means and said shoulder means, through said resilient means pressure force; and
   e. screw adjusting means engaged with one of said wedge-shaped members for producing a movement thereto upon activation of said screw adjusting means, whereby said movement will cause displacement of said wedge-shaped members so that relocation of said shoulder means occurs and said rod holding means is adjusted.

2. A welding gun apparatus as claimed in claim 1 wherein said screw adjusting means is provided with threads complementing with threads disposed on said one wedge-shaped member so that rotational activation of said screw adjusting means provides a linear movement to said one wedge-shaped member, whereby said wedge-shaped members' inherent inclined surfaces will slide along one another so that dislocation between said members causes movement to said rod holding means in a direction coincident with said holding means longitudinal axis which movement is substantially perpendicular to the movement of said one shaped wedge member.

3. A welding apparatus as claimed in claim 2 wherein said resilient means comprises a spring compressively mounted between said rod holding means and said welding apparatus body and wherein the force produced by said spring is enacted upon said welding rod means so that a continuous force is employed towards said guiding means within said housing thereby holding said wedge-shaped members located between said guiding means and said rod holding means shoulder in abutting contact with one another another.

4. A welding gun for use in jigs or the like provided with rough and fine adjusting means, comprising, in combination:
   a hollow body having a front, an intermediate, and an end portion;
   a nozzle operably engaged to said front portion;
   a housing operably engaged to said end portion;
   a pair of adjustably positioned mounting nuts operably engaged to said intermediate portion about its outside circumference for fastening to an associated jig means at an approximate determined location;
   welding rod holding means slidably and resiliently positioned within said body, nozzle and housing;
   fine adjusting means disposed within said housing for actually adjusting said holding means whereby said holding means and its associated welding rod are positioned at their exact optimum location with respect to an associated work piece by manual activation of said fine adjusting means; and
   wherein said fine adjusting means includes adjusting screw means engaged with a wedge means, said wedge means being slidably disposed for converting rotational motion of said screw means into a first linear motion, transferring means slidably contacting said wedge means for transferring said first linear motion into a second linear motion in a direction substantially perpendicular to said first said first linear motion, and means disposed on said rod holding means for receiving said second motion so that said rod holding means is moved along its longitudinal axis into a required exact location as induced by activation of said screw means.

5. A welding gun as claimed in claim 4 wherein said transferring means comprises a washer having a cross-sectional substantially right-angled triangular configuration.

6. A welding gun as claimed in claim 4 wherein said receiving means comprises a shoulder extending on said rod holding means in contacting engagement with said transferring means through said resilient positioning force of said rod holding means.

7. The welding gun as claimed in claim 5 wherein said washer cross-sectional substantially right-angled triangled configuration has its hypotenuse in a contacting sliding complementing engagement against one of said frustoconical sloping sides of said wedge means so that induced movement of said wedge means will cause a linear displacement to said washer in line with said right angle base.